July 28, 1936.   O. BÖHM   2,048,726
TRANSMITTING ANTENNA FOR OBTAINING REDUCED HIGH ANGLE RADIATION
Filed July 24, 1934
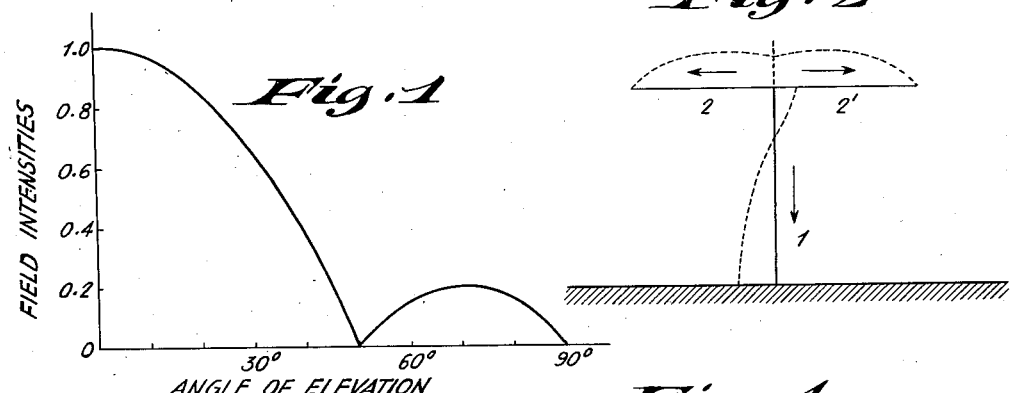
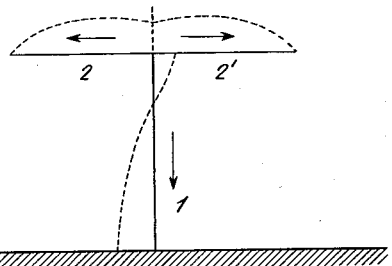
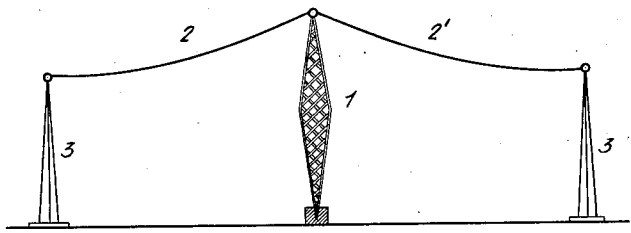
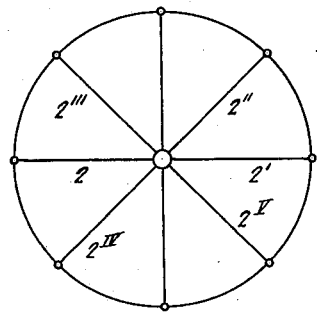
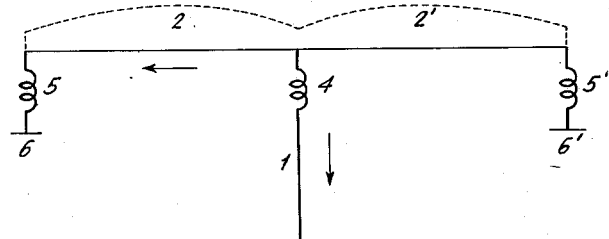
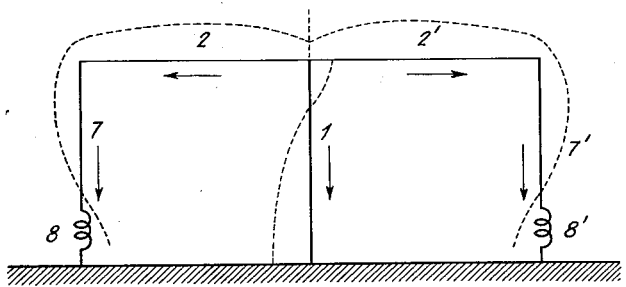
INVENTOR
OTTO BÖHM
BY
ATTORNEY Patented July 28, 1936

2,048,726

UNITED STATES PATENT OFFICE 2,048,726

TRANSMITTING ANTENNA FOR OBTAINING REDUCED HIGH ANGLE RADIATION

Otto Böhm, Berlin, Germany, assignor to Telefunken Gesellschaft für Drahtlose Telegraphie m. b. H., Berlin, Germany, a corporation of Germany Application July 24, 1934, Serial No. 736,746
In Germany July 24, 1933

4 Claims. (Cl. 250—33)

This invention relates to antennae, and particularly to antennae for obtaining reduced high angle radiation.

It is well known that the range of good broadcasting reception can be increased by suppressing high angle radiation from a transmitting antenna. In achieving the suppression of high angle radiation, however, there frequently occurs fading at a particular location distantly removed from the transmitting antenna due mainly to interference between the wave reflected from the heaviside layer and the directly received wave.

In accordance with the present invention there is obtained satisfactory reduction of high angle radiation from a transmitting antenna, by the use of compensating radiation; in other words, there is added to the radiation from an ordinary antenna a second radiation which compensates the main radiation within a desired angle range by means of suitably oriented auxiliary antennae properly excited as to amplitude and phase.

In the drawing, Fig. 1 illustrates a curve explanatory of the operation of antenna systems provided with compensating means, and Figs. 2 to 6, inclusive, illustrate various embodiments of the invention.

Fig. 1 shows a vertical diagram thus produced by the use of compensating means. The abscissa axis represents the angles of elevation, and the ordinate axis the proportional values of the intensities of the transmitter field. The practical construction of compensating antennae of the described type involves considerable difficulties, since various points are to be considered. These involve the requirement of a possibly small height of the mast, and a small surface extent of the entire arrangement, as well as a convenient feed, and a high radiation resistance of the antenna system.

The antenna according to the present invention fulfills the desired requirements. Essentially, the invention comprises a vertical central conductor I (see Fig. 2) and several horizontal roofing conductors 2, 2' etc. symmetrically distributed about said central conductor. The number of these radial roofing wires is to be such that a sufficiently balanced circular horizontal diagram is obtained. To this end six conductors should, in general, be sufficient, forming the radii of a regular hexagon (see Fig. 3 showing the bottom view of such antenna). In order to obtain the required vertical diagram similar to that shown in Fig. 1, the distribution of the current on the antenna must be approximately of the kind indicated in Fig. 2 by dotted lines and arrows. The currents in the vertical conductor and in the roofing wires must be essentially in opposite phase, i. e., in the moments in which the current vector in the roofing wires is directed from the center towards the outside, a current must prevail in the vertical conductor which is directed essentially downwards. This condition is achieved if the dimensioning of the antenna is carried out in such manner, in considering the used wave lengths, that near the upper end of the vertical conductor a current node and thus a phase reversal is produced. Obviously this condition will be obtained if the radial length of each roofing wire is less than $\lambda/2$, and the sum of the length of the half of the vertical part plus that of each roofing wire exceeds however $\lambda/2$.

The above described principal shape of the antenna can be modified in practice in various ways. In view of the greater number of required outer masts and the cost of each single mast which rapidly increases with the height, it may be of advantage to provide outer masts 3 that are lower than the central mast (see Fig. 4). The roofing wires in this case assume the shape of an umbrella inclining outwards toward the ground. This shape does not involve a principal change in the functioning of the antenna, but in calculating the vertical diagram produced, the vertical component of the current in the roofing conductors is to be considered. In accordance with Fig. 4, the central supporting mast I itself is rendered current conducting, a measure which can be always resorted to for the purpose of saving a special conductor.

If local or economical conditions do not permit of the dimensioning of the antenna in accordance with the above mentioned conditions, it can be deviated therefrom by substituting in a known manner a part of the geometrical lengths by means of concentrated tuning devices. In the example according to Fig. 5, an inductance 4 is inserted at the upper end of the vertical conductor, and which serves to decrease the required height of the central mast. Furthermore, according to this example, at the outer ends of the roofing wires lengthening inductances 5, 5' etc. with suitably formed end capacities 6, 6' etc., are provided. By this latter means the geometrical length of the roofing wires and thus the requirement of ground surface for the antenna are diminished.

Finally it is also possible, to extend the roofing wires at the ends thereof vertically downwards (7 in Fig. 6) whereby they are either insulated at the ends, or they may be connected to ground across tuning means 8, 8'. For the downward extension the metallic outer masts themselves may serve.

What is claimed is:

1. A transmitting antenna for obtaining reduced high angle radiation comprising a vertical central conductor having conductively attached to its upper end a plurality of symmetrically arranged, substantially horizontal conductors, the radial length of each conductor of said plurality being less than one-half the length of the communication wave, the total length, however, of one-half of the vertical central conductor and any one of said plurality of conductors being greater than one-half wave length whereby there will occur a current node on the upper half of the vertical conductor.

2. A transmitting antenna for obtaining reduced high angle radiation comprising a vertical conductor having conductively attached to its upper end a plurality of symmetrically arranged conductors inclined towards the ground in the shape of an umbrella, the radial length of each conductor of said plurality being less than one-half the length of the communication wave, the effective length, however, of one-half of the vertical conductor plus any one of said plurality of conductors being greater than one-half wave length, whereby there will occur a current node on the upper half of the vertical conductor.

3. A transmitting antenna for obtaining reduced high angle radiation comprising a vertical conductor having conductively attached to its upper end a plurality of symmetrically arranged conductors angularly disposed with respect to said vertical conductor, the radial length of each conductor of said plurality being less than one-half the length of the communication wave, the effective length of one-half of the vertical conductor plus any one of said plurality being greater than one-half wave length, said conductors being so designed and arranged that the current in the vertical conductor is in opposite phase relative to the currents in the plurality of conductors.

4. An antenna comprising a vertical conductor having conductively attached to its upper end a plurality of symmetrically arranged conductors angularly disposed with respect to said vertical conductor, the electrical length of each conductor of said plurality being less than one-half the length of the communication wave, the electrical length of one-half of the vertical conductor plus the electrical length of any one of said plurality being greater than one-half wave length, whereby there will occur a current node on the upper half of the vertical conductor.

OTTO BÖHM.